Figure 1:
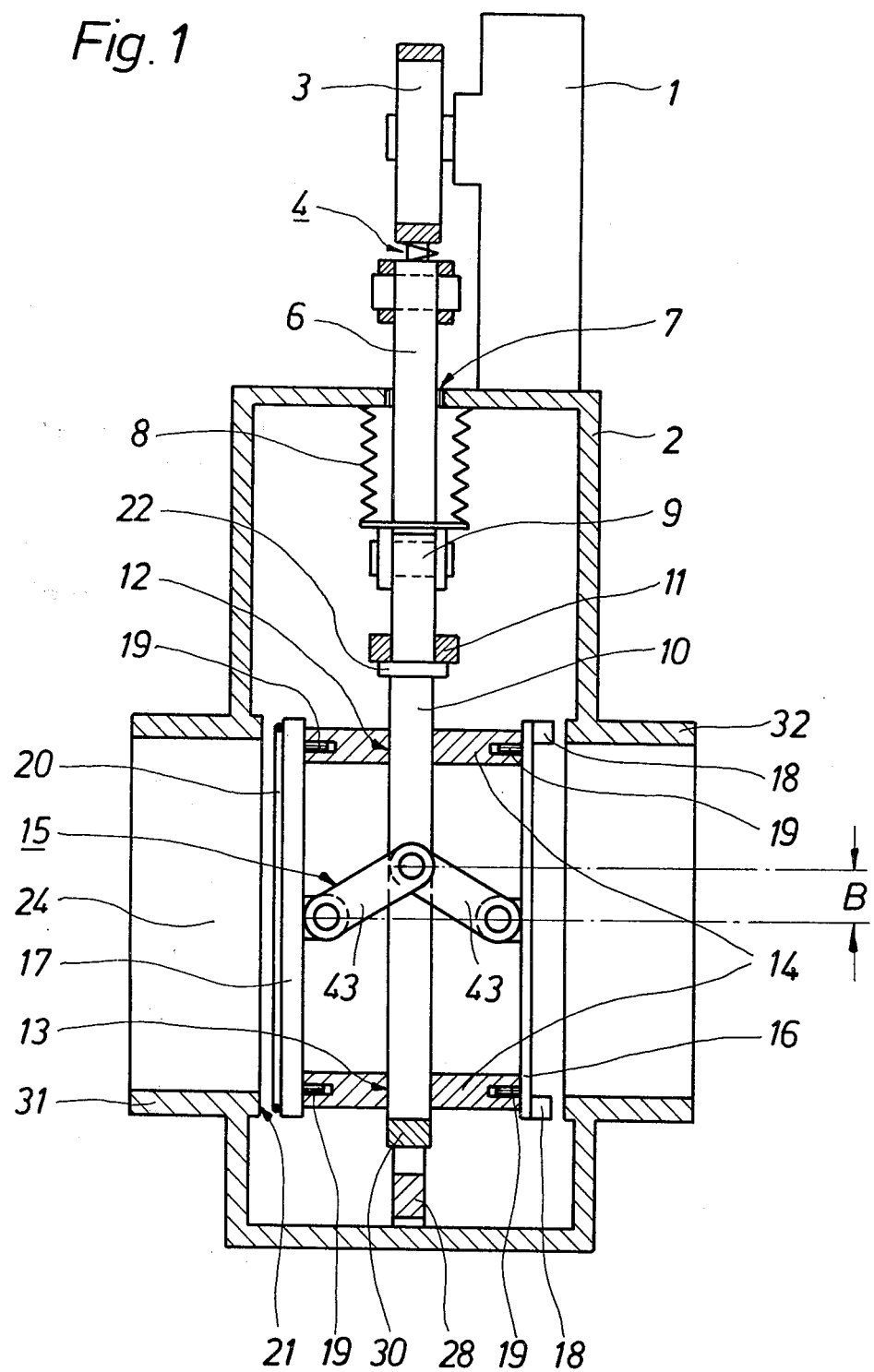

United States Patent [19]

Reimpell et al.

[11] 4,328,947

[45] May 11, 1982

[54] PENDULUM GATE VALVE

[75] Inventors: Uwe Reimpell; Lutz Grein, both of Hanau am Main; Reinhard Reiter, Gelnhausen; Friedrich Stark, Langenselbold, all of Fed. Rep. of Germany

[73] Assignee: Leybold-Heraeus GmbH & Co. KG, Cologne, Fed. Rep. of Germany

[21] Appl. No.: 41,214

[22] Filed: May 21, 1979

Related U.S. Application Data

[63] Continuation of Ser. No. 820,957, Aug. 1, 1977, abandoned.

[30] Foreign Application Priority Data

Aug. 3, 1976 [DE] Fed. Rep. of Germany ....... 2634885

[51] Int. Cl.³ .............................................. F16K 31/44
[52] U.S. Cl. ..................... 251/80; 251/167; 251/197; 251/228; 251/302
[58] Field of Search ............... 251/302, 228, 167, 197, 251/169, 80, 198, 200, 335

[56] References Cited

U.S. PATENT DOCUMENTS

| | | | |
|---|---|---|---|
| 1,534,513 | 4/1925 | Fulton | 251/197 |
| 2,058,951 | 10/1936 | Buirk | 251/111 X |
| 3,254,660 | 6/1966 | Ray | 251/228 X |
| 4,073,465 | 2/1978 | Sheppard | 251/80 X |

Primary Examiner—Harold W. Weakley
Attorney, Agent, or Firm—Sprung, Felfe, Horn, Lynch & Kramer

[57] ABSTRACT

A pendulum gate valve with a pressure tight housing and inlet and outlet openings arranged on opposite sides of the housing. The drive rod for the pendulum frame is guided throughout its total path by a joint connected to the pendulum frame which can swivel about the shaft of the pendulum frame but can in addition also move independently of the swiveling motion of the pendulum frame. A guide mechanism is provided for the further movement of the joint outside the swiveling range, which forces the joint onto a path that runs substantially parallel to the drive rod. The guide mechanism consists of a thrust rod forming part of the pressing device which urges the gate valve plate against the sealing bearing surface and which is connected to the drive rod. The thrust rod is mounted in a longitudinally movable manner in the pendulum frame and runs parallel to the drive rod in the closed position of the gate valve plate.

12 Claims, 11 Drawing Figures

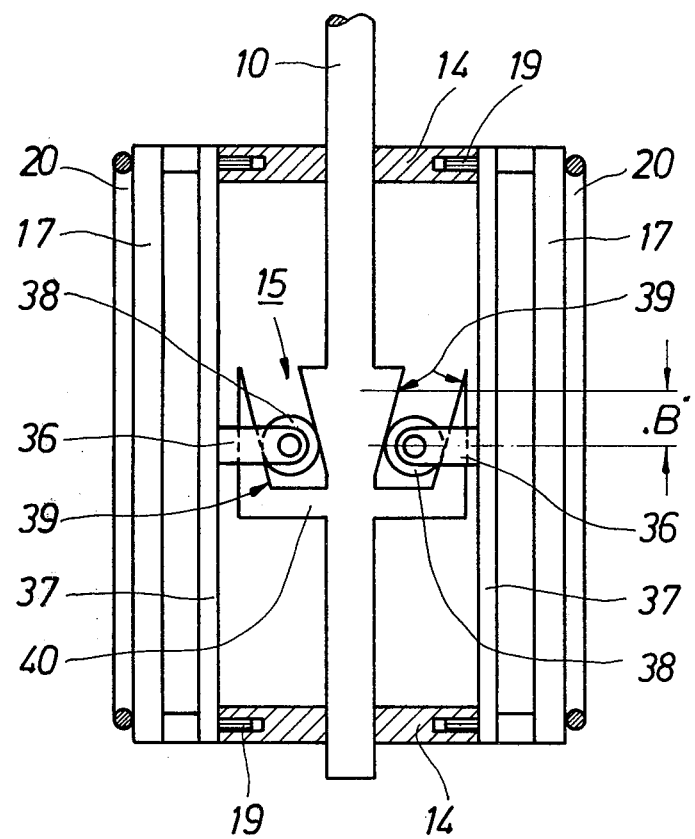

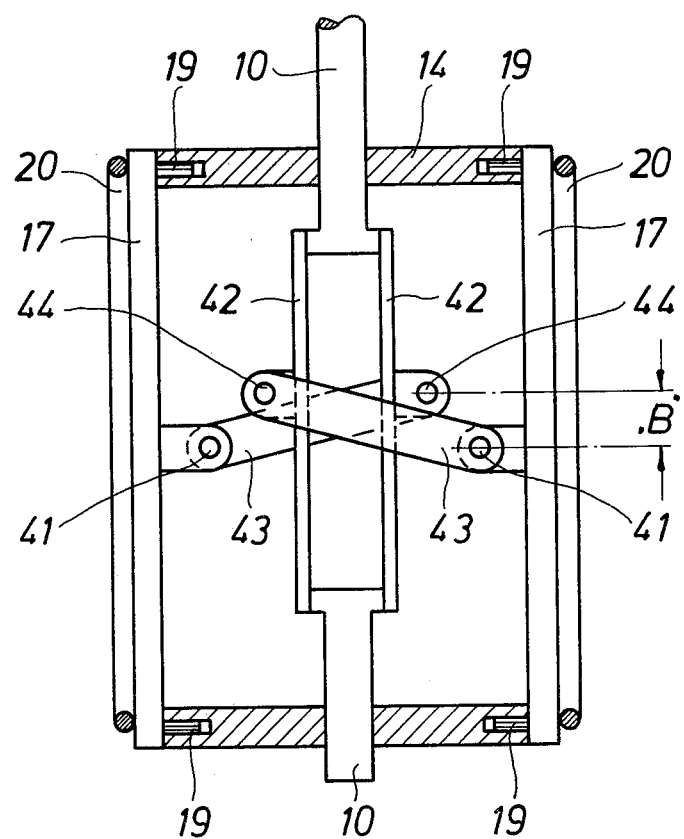

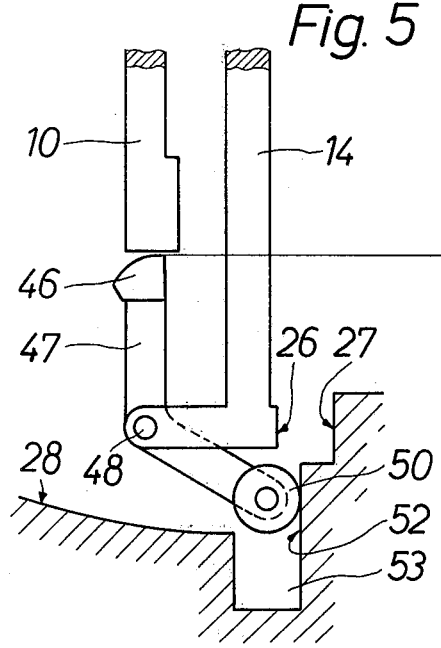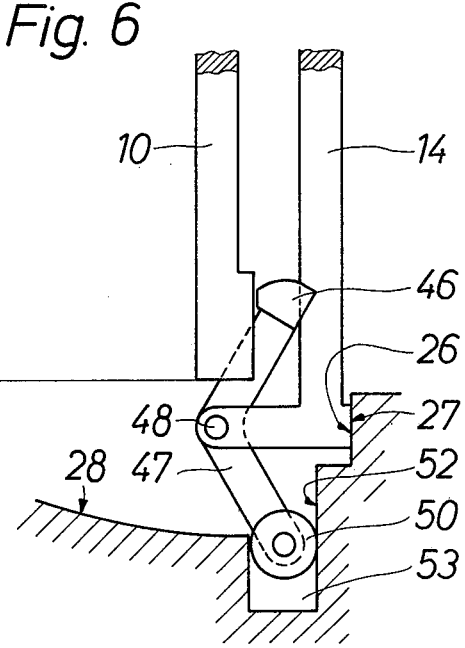

PENDULUM GATE VALVE

This is a continuation, of application Ser. No. 820,957, filed Aug. 1, 1977, now abandoned.

The invention relates to a pendulum gate valve with a pressure-tight housing and inlet and outlet openings arranged on opposite sides of said housing, with at least one seal bearing surface and at least one gate valve plate arranged on a pendulum frame, wherein the pendulum frame can swivel transverse to the axis of the inlet and outlet openings about a stationary shaft as far as a stop means, and the gate valve plate is movably mounted opposite the pendulum frame parallel to the axis of the inlet and outlet openings, and the gate valve is furthermore provided with a drive rod which is connected to the pendulum frame and passes in a pressure-tight manner through the housing, and with a pressing device longitudinally movably mounted in the pendulum frame and actuated by the drive rod, for urging the gate valve plate against the seal bearing surface, wherein the drive rod acts on a joint connected to the pendulum frame which can swivel about the shaft of the pendulum frame but can in addition also move independently of the swivelling motion of the pendulum frame and is connected to the pressing device for the gate valve plate in such a way that during the closure movement the pendulum frame is first of all brought to the stop means and the gate valve plate is thereby brought into alignment with the valve seat, whereupon the pressing device can be actuated by further movement of the joint and wherein the median line of the swivelling range of the joint about the shaft of the pendulum frame is substantially vertical to the direction of movement of the drive rod (path A).

Such gate valves have to satisfy special requirements if used in connection with radioactive and toxic gases, especially with uranium hexafluoride. For example, it is not permissible to carry out normal rotational and sliding operations; double seals, with the use of metal bellows, must be provided for all movements into the gate valve housing. This requirement leads to considerable difficulties in transmitting the drive forces to the gate valve. Since the gate valve interior becomes contaminated and toxic during operation, and decontamination and cleansing is difficult to carry out, a particularly high resistance is required of all parts, seals and bearing materials that are used. It is not possible to lubricate the bearings, and therefore specially selected, self-lubricating materials must be used, which permit only limited surface contact pressures. The play in the mechanism resulting from the deformation of the bearing materials, seals and also by deformation of the other materials must therefore be compensated by appropriate devices during prolonged operation.

All internal surfaces which come into contact with gases should be surface protected, e.g. nickel-plated or coated with other materials. Some of these materials do not have a high surface hardness. For this reason spherical- and roller-type closures with high surface contact pressures, such as in the case of normal gate valves, can be used only to a limited extent. Since no lubricants can be used, there is in addition the danger of increased surface abrasion during sliding movements. Compared with the conventional vacuum gate valves, in which a comparable degree of impermeability is desired and which are only subjected to a pressure difference of at most 1 atmosphere, gate valves for the afore-mentioned purpose must function and be impermeable also at substantially higher pressures. Operating pressures of for example 5 to 10 atmospheres are normal, which means considerably higher pressing forces on the gate valve plate and thus increased stress on all bearings and parts.

Linear gate valves for use in vacuo and with gases are generally known. In this connection, the gate valve plate and the pressing device are mounted on a frame which can be displaced linearly vertically in the housing. The gate valve plate and its pressing device are tensioned with springs and drawn against the frame. The drive rod acts from the drive outside the housing on the pressing device, which may have a wedge, roller member or articulated lever mechanism. The tensioning forces of the pressing device are thus greater than the displacement forces for the frame, with the result that with the closure movement of the drive rod, the pressing device can be actuated and thus the gate valve plates can press against the sealing surfaces in the housing only when the frame or the gate valve plate bears in the closed position against a stop means on the side of the housing. On opening, the springs first of all draw the gate valve plate in the opposite manner against the frame before the drive rod moves the frame, together with the gate valve plate, into the opened position. A basic disadvantage of linear gate valves is the adjustment movement of the drive rod, corresponding to the size of the opening width of the gate valve, and the following adjustment movement for the pressing device, which is relatively small compared to the aforementioned adjustment movement.

The ratio is even more unfavourable particularly with respect to the necessary drive forces. The magnitude of the thrust force of the drive rod exerted in the pressing movement is generally ten times greater than the force necessary for the gate valve movement.

The unfavourable force ratios can be improved by so-called pendulum gate valves. A pendulum gate valve of the type described at the beginning is disclosed in DT-OS No. 25 11 591. In the previously known device, the joint arranged between the drive rod and pendulum frame on a lever that can move about the shaft of the pendulum frame partially independently of said pendulum frame, moves on a single circular path. The median line for the swivelling range of the closure movement is in this connection at an angle to the drive rod that deviates noticeably from 90 degrees. This swivelling range continues downwardly through the swivelling range for pressing the gate valve plate on the valve seat, with the result that the joint moves approximately along a third of a circle. This results in a considerable lateral deflection of the drive rod, which necessitates an additional joint and additional bearings in the drive, and at the same time the sealing and operational problems are magnified. This is particularly so with regard to the requisite metal bellows, which in their high safety, seamless construction permit only short linear movements and extremely small bending movements. Furthermore, the movement of the joint over a considerable part of a circular path results in a continuously changing lever arm for the drive force, which is a disadvantage especially with the high pressing forces required at the end of the pressing-swivelling movement and caused by the reduction in the drive moment on the pressing device. Furthermore, the possible swivelling and pressing angle is restricted in such a way by an angular movement of the prior art lever that this type of construction can be used only for relatively small high vacuum gate valves.

In the pendulum gate valve according to DT-OS No. 25 11 591, the gate valve plate is moved away parallel to the swivel axis from the pendulum frame by a pressing device mounted in the said pendulum frame, by means of roller bodies which are displaced on wedge-shaped tracks, and is pressed against the sealing surface in the housing. In this connection, springs are arranged between the gate valve plate and pendulum frame which are intended to retract the gate valve plate when the pressing device is released. This procedure is possible in the case of small vacuum gate valves and with gate valves which do not have to be opened and closed against fairly high pressures, and accordingly damage to the seals is avoided during the swivelling motion. In the case of large gate valves particularly with high bilateral pressures, a retraction of the gate valve plate by the force of springs is insufficient.

It is also known to mount the gate valve plates with guide pegs in arch-shaped recesses in a closure lever and to press the plates by means of springs and stops against said closure lever, roller bodies arranged in the pressing device being mounted in said closure lever. By this procedure the closure lever also takes over the functions of the pendulum frame, which can be omitted without the operation of the sequential swivelling and pressing movements of the drive rod being altered.

French Patent Specification No. 1 513 276 describes a pendulum gate valve of the type described at the beginning in which a double-armed angle lever is mounted on the pendulum frame, one arm being connected to the drive rod and the other arm being connected to the pressing device for the gate valve plates. The angle lever is connected to the drive rod via a lateral slit in the latter, in which slides a peg mounted on the angle lever. On account of this, the angle lever cannot take over the guidance of the drive rod. The latter must instead be stably guided in another manner in order to prevent any lateral deflection. The pressing device thus has a thrust rod which is not parallel to the drive rod. The necessary force deflection is produced by the afore-mentioned angle lever, and accordingly unavoidable transverse components arise. In the second part of the movement path of the peg connected to the drive rod, the said peg, which exercises the function of the joint, likewise does not execute any movement which is directed substantially parallel to the drive rod. On account of the restricted size of the angle lever the latter must be able to rotate within a considerable swivelling range, with the result that the joint and the peg execute a considerable transverse movement. On account of the many transmission elements, the known drive means is costly and subject to failure. The known gate valve is unsuitable for large nominal widths.

The object of the invention is to provide a pendulum gate valve of the type described at the beginning, which can also be used for fairly large nominal widths of for example above 300 mm as well as for radioactive and toxic gases, and in which the movement of the drive rod and of the joint acting on the pendulum frame and the pressing device is largely linearised at the lower end of the drive rod, in which the ratio of the actuation paths for the swivelling movement and the pressing movement can be adapted to the force requirements given in any particular case for the individual movements, and in which a force deflection is largely excluded.

A further embodiment of the invention is thus concerned with the additional objective of replacing the spring retraction of the gate valve plate by a forced or constrained retraction, and thereby ensuring that the drive mechanism can in each case be executed only by one of the two operations "SWIVEL" and "PRESS".

The above objective is met in accordance with the invention in the pendulum gate valve described at the beginning, by providing that (a) the drive rod is guided throughout its whole path by the joint, (b) for the further movement of the joint outside the swivelling range guide means are provided which force the joint on to a track which runs substantially parallel to the drive rod (path "B"), and (c) the guide means consist of a thrust rod forming part of the pressing device and longitudinally movably mounted in the pendulum frame, which thrust rod runs parallel to the drive rod in the closed position of the gate valve plate.

The object of the invention has the following advantages: By virtue of the direct guidance of the drive rod by the joint, special guide means, which necessarily involve frictional losses, can be dispensed with. Practically no transverse forces act on the drive rod. The extremely small transverse movements of the drive rod caused by the guidance have no damaging effect on the seal of the drive rod opposite the gate valve housing. Above all, the parallel arrangement of drive rod and thrust rod for the pressing device in the closed position enables forces to be transmitted directly and rectilinearly from the drive rod to the thrust rod, with the result that high actuation forces, which are necessary for the secure closure of the gate valve, can be transmitted.

By suitably choosing the lateral distance between the drive rod and its joint and the shaft of the pendulum frame, it is possible in a simple manner to influence the ratio of the actuation paths for the swivelling movement on the one hand and for the pressing movement on the other hand, and for example to adjust it to 1:1.

In this way it is possible to construct simple, operationally safe and large pendulum gate valves for radioactive and toxic gases, especially for use at elevated gas pressures.

The guide means according to the invention for the rectilinear or substantially rectilinear guidance of the joint on the drive rod can be effected in various ways. Thus, for example, it is possible to guide the thrust rod in a longitudinally movable manner in bearings and to restrict the longitudinal movement of the thrust rod so that the joint located at the drive rod/thrust rod connection point executes on the path "A" with the pendulum frame a swivelling movement about the shaft of said pendulum frame, and on the path "B" within the stationary pendulum frame, a linear movement in the direction of the drive rod. With a vertical arrangement of the drive rod the joint completes throughout its whole path a movement composed of a slightly bent C and a connected straight downward section. In each case the thrust on the drive shaft is transmitted, without gearing and without changing the path of the force, to the thrust rod in order to initiate the pressing movement of the gate valve plate on the valve seat. The rotational moment for the swivelling movement, which can be kept relatively small in relation to the actuation force for the pressing movement, is governed by the lateral distance between the drive rod and joint, and the shaft of the pendulum frame.

Another, even more advantageous design of the object of the invention with respect to the guide means is characterised in that the guide means consists of a lever that can swivel in the pendulum frame about a (further) shaft, with which lever the drive rod and a thrust rod belonging to the pressing device engage, wherein this shaft is arranged spaced apart from the shaft for the pendulum frame and transverse to the drive shaft, and the median line of the swivelling range of the lever, referred to the closed position of the gate valve plate, is substantially vertical to the direction of movement of the drive shaft, and in that the swivelling range of the lever is limited so that the joint at the drive rod/lever connection position executes on the path "A" with the pendulum frame a swivelling movement about the shaft of said pendulum frame, and executes on the path "B" within the stationary pendulum frame a further swivelling movement around the (further) shaft arranged within said pendulum frame. In this connection, the joint executes a somewhat S-shaped movement when traversing the paths "A" and "B", which similarly does not result in any marked lateral deviations of the drive rod. The curvature of the connected, downward circular arc is thus smaller the greater the lateral distance between the shaft for the lever and the shaft for the pendulum frame. Since in this case the engagement point of the thrust rod on the lever can be freely chosen within certain limits, there is the additional advantage that the conversion ratio between the drive rod and thrust rod can be influenced. In this way the smaller force requirements for executing the swivelling movement and the higher force requirement for executing the pressing movement can be taken into account.

The object of the invention can be further amplified in an advantageous manner if the pendulum gate valve is provided with a locking device that arrests the pressing device on the path "A" in the "NOT PRESSED" position, and the pendulum frame in the "PRESSED" position. In this way the individual operations "SWIVEL" and "PRESS" are clearly separated from one another, and it is impossible, for example, for the gate valve plate with the sensitive seal on the seal bearing surface to execute a sliding and frictional movement in the housing. If for example in the previously known spring retraction the gate valve plate sticks to the valve seat and the forces of adhesion cannot be overcome by the force of the spring, then the valve plate would necessarily break away, which could destroy the seal and/or sealing surface.

According to the further feature of the invention the locking device can also be formed in various ways. It can for example consist of a curved track concentric with the shaft of the pendulum frame, whose arc length corresponds to the swivel angle of the pendulum frame, as well as a bar arranged on the thrust rod, the curved track and bar being matched with respect to one another so that the relative movement between the pendulum frame and thrust rod is prevented during the swivelling movement by the bar sliding on the curved track, but that the thrust rod is released by the pendulum frame on reaching the stop means, and that conversely the pendulum frame is released for the swivelling movement only when the thrust rod has been retracted to the "NOT PRESSED" position. In this connection, it is particularly advantageous to arrange the curved track outside the swivelling range of the pendulum frame, and the thrust rod passes through the pendulum frame and is extended in the direction of the curved track by a bar which satisfies the afore-mentioned conditions.

As an alternative it is however possible to form the locking device from a curved track concentric with respect to the shaft of the pendulum frame, whose arc length corresponds to the swivelling angle of the pendulum frame, as well as from a bar located on the lever arranged in said pendulum frame, wherein the curved track and bar are matched so that relative movement between the pendulum frame and lever is prevented during the swivelling movement, but that the lever is released on reaching the stop means between the pendulum frame and housing, and that conversely the pendulum frame is released for the swivelling movement only when the lever and with it the thrust rod is retracted into the "NOT PRESSED" position. The arrangement of the curved track in the region of the bar attached to the relatively small lever provides a space-saving form of construction. The curved track may for example be arranged in the immediate vicinity of the shaft for the pendulum frame.

It is furthermore advantageous to provide the pressing device with restraints acting in both directions. This can be provided for example by a slot link guide on the thrust rod, which co-operates with rollers on the valve plates, or by means of brackets arranged between the thrust rod and valve plates, such as will be described hereinafter in more detail in connection with the embodiments. It is however particularly convenient to make the constraint in the form of a toggle lever system. The constraint not only enables the retraction springs to be dispensed with, which have to be additionally tensioned during pressing and thus considerably increase the drive forces, but also has a release action in the case of adhesion, described above, between the valve plate and seal bearing surface.

It is furthermore advantageous to arrange an elastic intermediate member in the drive system which is compressed during the movement on the path "B". In this connection, the intermediate member serves not only as a so-called overload coupling, but also holds the rods under a certain tension after the drive has come to a stop, and compensates for any wear or deformation of the seal and drive parts. This equalisation effect is particularly reliable if for example the toggle lever system is arranged so that the toggle lever joints can be held in a position substantially different from the stretched condition. The elastic intermediate member may also for example be replaced by a power-limited drive such as a hydraulic or pneumatic drive, or by a motor drive having a sliding clutch.

Figure 2:
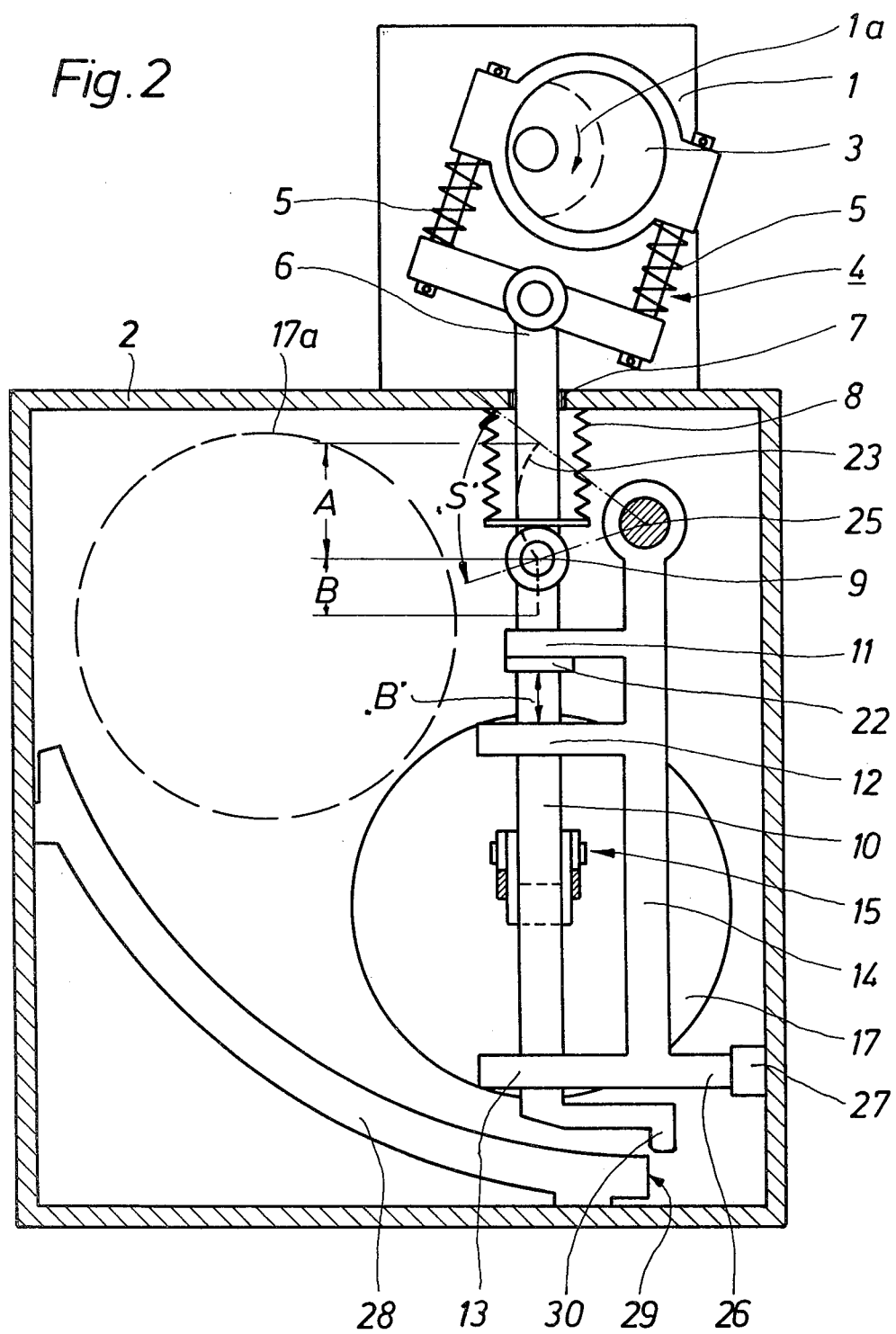
Figure 7:
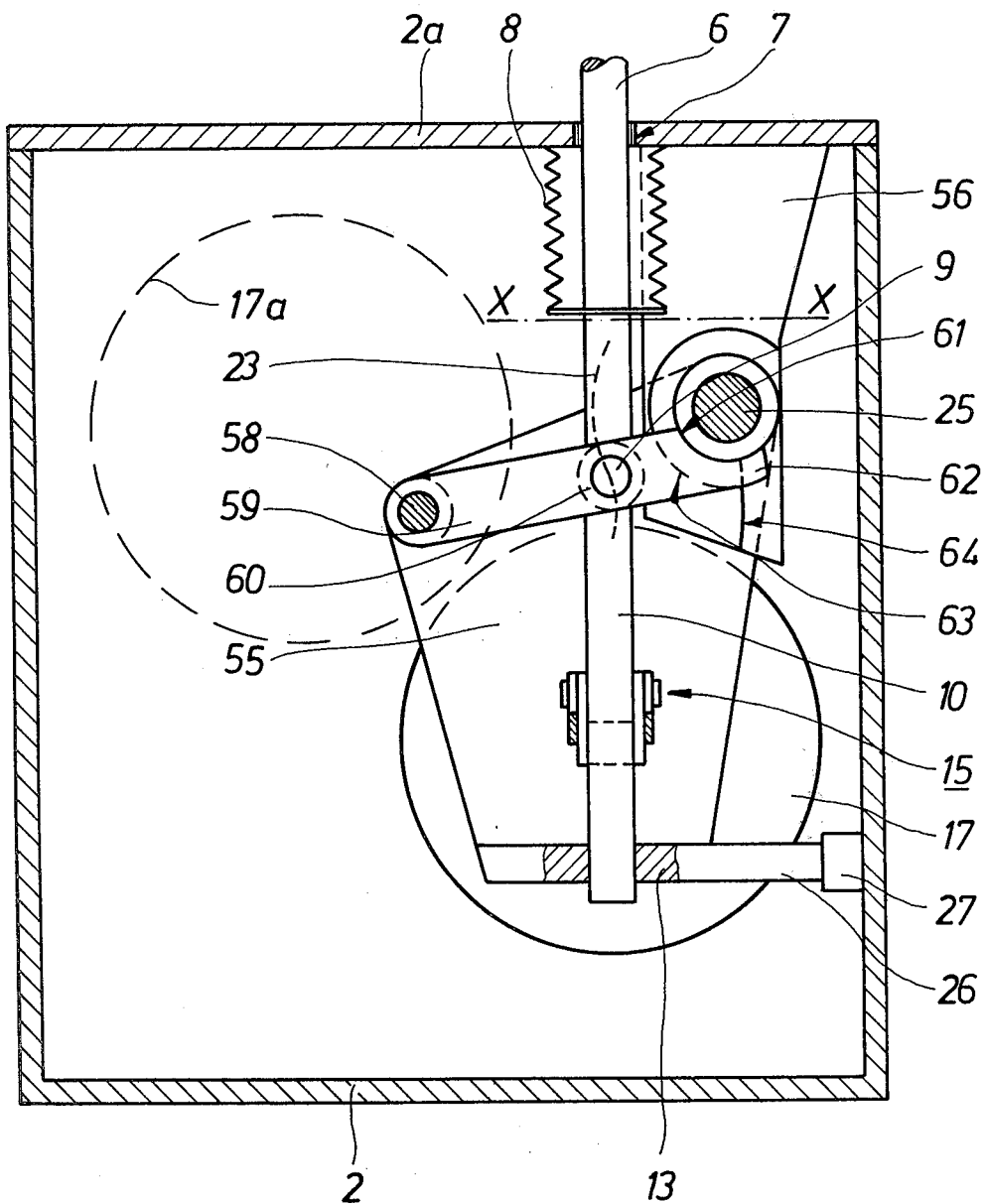
Figure 8:
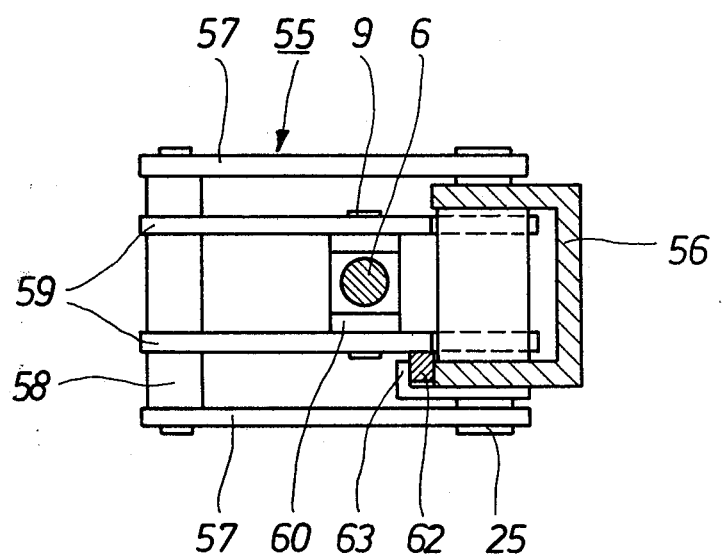
Figure 9:
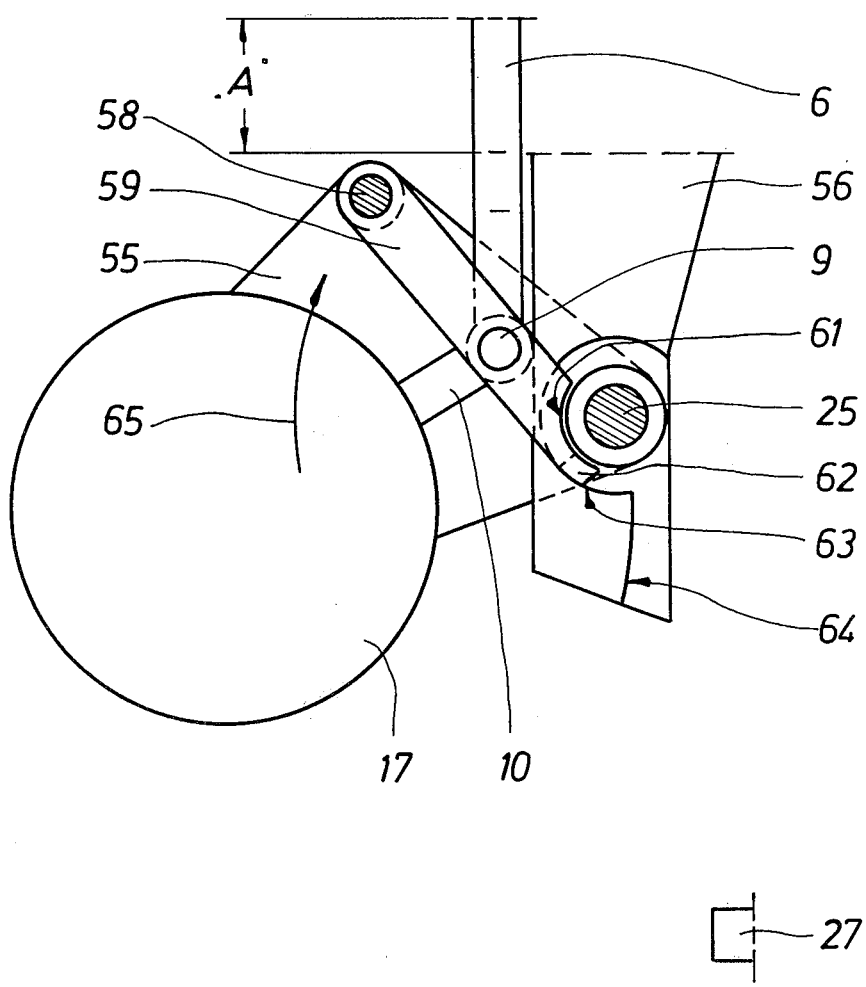
Figure 10:
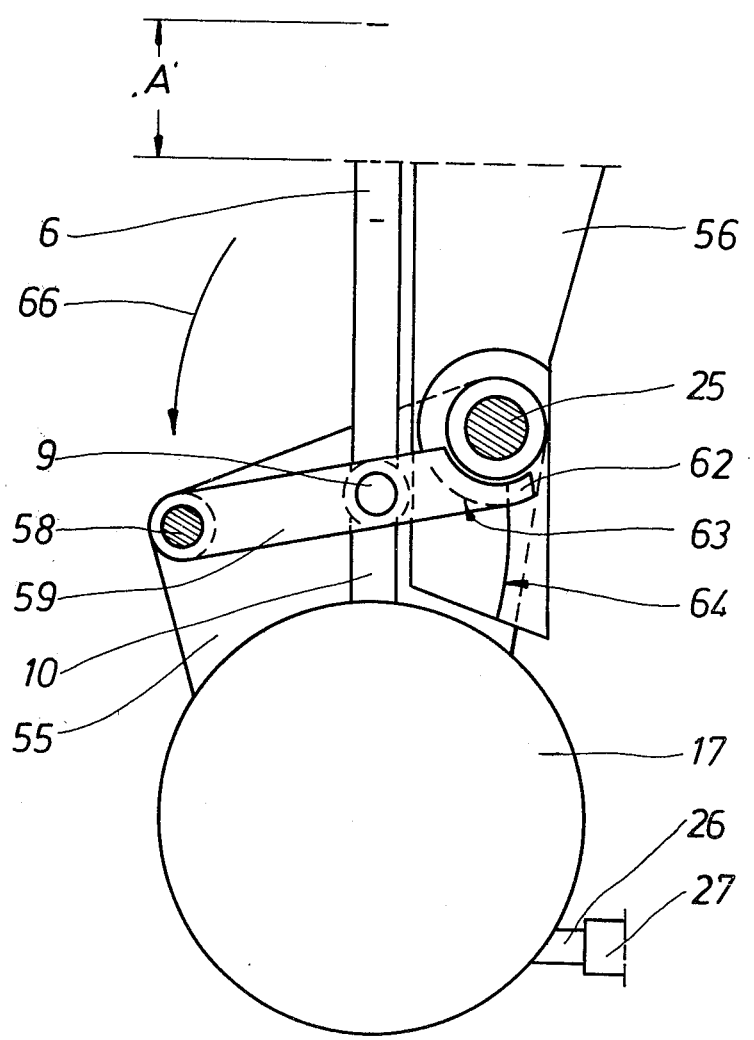
Figure 11:
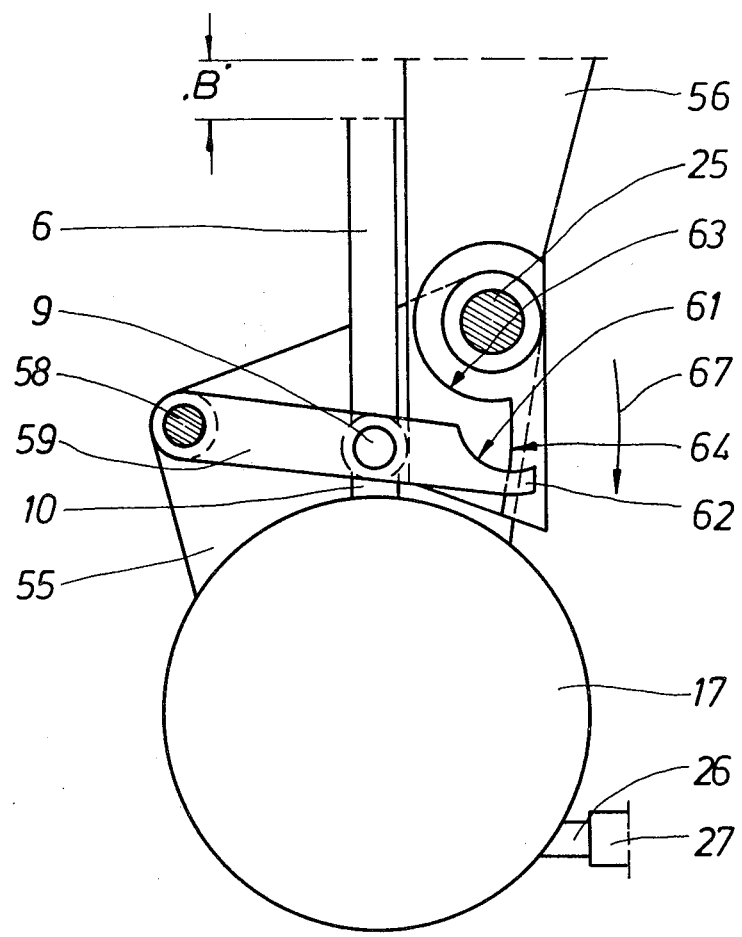

Embodiments of the object of the invention and their operation and further advantages will be explained in more detail hereinafter with the aid of FIGS. 1 to 11, in which:

FIG. 1 is a vertical section along the axis of the inlet and outlet opening of a pendulum gate valve, FIG. 2 is a side view of the object according to FIG. 1, with the front wall removed, FIGS. 3 and 4 are variants of the pressing device according to FIG. 1, on an enlarged scale, FIGS. 5 and 6 are a variant of the locking device according to FIG. 1, in different positions, FIG. 7 is a side view of another embodiment, similar to FIG. 2, FIG. 8 is a partial horizontal section through the object of FIG. 7, along the line X—X, and FIGS. 9, 10 and 11 show the movable parts of the pendulum gate valve according to FIG. 7, in various positions.

According to FIGS. 1 and 2, a drive motor 1 is arranged on a housing 2 and carries an eccentric disc 3 which acts on an elastic intermediate member 4 with pretensioned compression springs 5. A drive rod 6 is mounted on the elastic intermediate member 4 and passes into the interior through a guide 7 in the housing 2 and is sealed with respect to the housing by means of a double bellows 8 in the interior thereof. The drive rod 6 is coupled via a joint 9 to a pressing device. The latter consists of a thrust rod 10 guided in a pendulum frame 14 by means of the bearings 11, 12 and 13, and of a restraint 15, which in the present case is formed as a toggle lever system. The restraint 15 acts on an abutment 16 having the characteristics of a spring, and on a valve plate 17. The abutment 16 is provided with feet 18 for support on the housing 2, and also with guide pegs 19 which are mounted in the pendulum frame 14. The valve plate 17 has a seal 20 which can be mated with a seal bearing surface 21 in the housing 2. The thrust rod 10 of the pressing device is restricted as regards its displacement by a stop means 22 securely attached to said thrust rod and which rests at the top against the bearing 11 and in the downward movement against the bearing 12, in such a way that only the path "B" can be covered. The pendulum frame 14 is swivellably mounted in the housing 2 by means of a shaft 25, and carries a stop means 26 which rests against a counter stop means 27 in the housing 2 as long as the valve plate 17 is in the closed position.

A curved track 28 is arranged in the housing 2, which is concentric to the shaft 25 and is provided with an edge 29, against which a bar 30 located on the thrust rod 10 comes into contact, and which locks the thrust rod and thus the pendulum frame in the downward movement of the said thrust rod when executing the pressing movement. In the swivelling movement and in the upper position of the thrust rod in which the gate valve plate 17 is retracted, the bar 30 can slide with a minimum spacing over the curved track 28. The composite movement path 23 of the joint 9 is shown by means of a dotted line. It can clearly be seen that the total path is composed of the path "A", which is slightly arch-shaped, and the path "B", which is rectilinear. The path "A" serves to swivel the pendulum frame 14, and the path "B" serves for the further downward movement of the thrust rod 10, for the purposes of bracing the gate valve plate 17 opposite the seal bearing surface 21. The swivel region "S" of the joint 9 about the shaft 25 is also shown, from which it can be seen that the median line (not shown) is directed substantially vertically to the drive rod 6.

In FIGS. 1 and 2 the pendulum frame 14 and with it the gate valve plate 17 (the latter shown as a continuous circle) is illustrated in a position between "SWIVEL" and "PRESS", i.e. the joint 9 has already executed the path "A" for the swivelling movement of the pendulum frame 14, and the gate valve plate 17 stands concentrically in front of the seal bearing surface 21, which surrounds the opening 24 to be closed. The seal bearing surface 21 and opening 24 are formed by a connecting sleeve 31 inserted in a pressure-tight manner in the housing 2. A further connecting sleeve 32 against which the feet 18 of the abutment 16 bear in the tensioned state is inserted coaxially to the first-mentioned sleeve in the opposite wall of the housing 2. The spatial arrangement of the gate valve plate 17 in the "open" position is shown by the dotted circle 17a. In this case the joint 9 is at the upper end of the movement path 23 and the pendulum frame 14 adopts a corresponding angular position (not shown) in the housing 2.

If the eccentric disc 3 is moved further by the drive motor 1 from the position shown in FIGS. 1 and 2 in the direction of the arrow 1a, the drive rod 6 is displaced further downwardly and executes the path "B". The joint 9 together with the thrust rod 10 thereby move downwardly, the abutment 16 and the gate valve plate 17 being moved outwardly by the restraint 15 formed as a toggle lever system until the maximum thrust is exceeded once the abutment 16 has been stressed and the valve plate 17 and seal 20 have been pressed on the seal bearing surface 21. At this moment the elastic intermediate member 4 comes into play, and the pretensioned springs 5 are deformed. At the same time the stop means 22 lies, in its lower position, i.e. at the end of the path "B", on the bearing 12. When the lower dead point of the eccentric disc 3 is reached the drive motor 1 is switched off via a limit switch (not shown). During the described movement of the thrust rod 10 downwards, the bar 30 moves behind the edge 29 and thereby locks the pendulum frame 14.

If the gate valve is to be opened from the closed position, the drive motor 1 is restarted, the eccentric disc 3 being moved on from the lower dead point position in the direction of the arrow 1a. In this connection, the eccentric disc 3 draws the thrust rod 10 upwardly via the drive rod 6 and the joint 9, and thereby actuates the restraint 15, with the result that the abutment 16 and the valve plate 17 are retracted into the position shown in FIG. 1. The bar 30 is likewise moved back to the position shown and thus releases the edge 29. As soon as or after this position is reached, the stop means 22 bears against the bearing 11 from below, and the drive rod 6 acts directly via the joint 9 on the pendulum frame 14 and swivels the latter, while covering the path "A" shown by the dotted line, into a position in which the gate valve plate 17 adopts the position of the dotted circle 17a, so that the gate valve opening 24 is completely released. During the swivelling movement of the pendulum frame 14 the bar 30 moves above the curved track 28, thereby ensuring that in no position of the swivelling movement can the pressing device be actuated by displacement of the thrust rod 10. The same locking effect also occurs with a return swivelling movement into the position shown in FIGS. 1 and 2. In the uppermost position of the eccentric disc 3 the drive motor 1 is switched off again by a limit switch, not shown.

The drive rod 6 is sealed by means of the double bellows 8. The thrust rod 10 is made resilient to the extent that it can be deformed in a transverse direction (horizontally) in the region of the restraint 15, whereby any different deformations there may be in the abutment 16, gate valve plate 17, seal 20 and transmission elements of the restraint can be compensated during the pressing movement.

The abutment 16 having the characteristics of a spring can be deformed to an extent which is sufficient, even after prolonged operation, to compensate for all deformations in the system. The elastic intermediate member 4, which has the function of an overload coupling, provides an additional possibility for readjustment. The maximum thrust of the thrust rod 10 can be adjusted by suitably pretensioning the compression springs 5. If there is a smaller deformation of the aforementioned parts than the predetermined deformation, the compression springs 5 respond by deformation when the adjusted thrust is exceeded. If the deformation of the remaining drive parts increases during the duration of operation, this is compensated by a correspondingly smaller deformation of the compression springs 5. As can be seen from FIG. 2, in this case the path "A" of the joint 9 necessary to swivel the pendulum frame 14 is somewhat larger than the path "B" to press the gate valve plate 17 on the seal bearing surface 21 and generate the pressing forces. Depending on the dimensioning of the pendulum angle, lever arms, as well as the conversion ratios in the restraint 15 (toggle lever), it is possible to dimension the paths "A" and "B" so that the same forces are required on swivelling and pressing. This is particularly important in order, on the one hand, to keep the path of the drive rod 6 small and thus have small dimensions for the necessary bellows, and on the other hand to obtain a favourable arrangement and loading of the drive. In this connection, electric motors having a crank mechanism, cam plates or spindle drives, as well as pneumatic or hydraulic drives, can be used in the usual way as drive means. A further advantage of the object of the invention is that by virtue of the small overall path of the drive rod 6, safety devices can also be used, i.e. combinations of pneumatic cylinders with self-closing clockwork mechanisms, and this in particular in the case of large gate valve plate diameters.

As already mentioned, roller and wedge locking devices in such gate valves for radioactive and toxic gases have only a limited use. The use of the toggle lever system as a restraint makes it possible, by having a suitable layout, to allow a smaller surface loading within the bearing. A toggle lever system in fact has the property that in the fully pressed, i.e. extended situation of the toggle lever, extremely high pressing forces can be achieved. However, with a permanent deformation of constructional elements such as seals, bearings, etc., there is no possibility of subsequent adjustment in such a case. However, the possibility of such a subsequent adjustment is of decisive importance for long-term use. In order to provide the possibility of subsequent adjustment also in the case of a toggle lever system, it is convenient to design the layout so that the toggle lever mechanism is not brought into the stretched situation in its end position, but instead there is still a sufficient swivelling range of the toggle lever after the pressing of the valve plate. In connection with a suitable layout for the elastic intermediate member 4 or for a drive having technically equivalent properties, efforts can be made to ensure that the toggle lever is permanently under the effect of a constant, limited force so that any possible deformations in the system can be reliably compensated. This is particularly important if for example the abutment 16 (FIG. 1) is replaced by a second valve plate which generally has no intrinsic spring characteristics.

In the following Figures the same parts and parts having the same function are provided with the same reference numerals, and repetition is therefore unnecessary. FIGS. 3 and 4 show details of variants of the pressing device according to FIG. 1, and in particular of that part which effects the compulsory guidance of the movable elements on the pendulum frame 14, such as the gate valve plate 17 and/or abutment 16. FIGS. 3 and 4 also show details which serve to produce, via a deformation of resilient members, a sufficient post-tensioning effect also in the case of a later deformation of the pressing device, gate valve plate and seal, and thereby provide a reliable seal during a prolonged operation of the pendulum gate valve.

The object according to FIG. 3 is shaped symmetrically with respect to the thrust rod 10 and has two gate valve plates 17 with corresponding seals 20, mounted in a horizontally movable manner by means of the guide pegs 19. Leaf springs 37 are arranged on the gate valve plates 17, and rollers 38 are mounted via pedestals 36 on said leaf springs and are guided in slotted arms 39 which are orientated at an acute angle to the thrust rod 10 and are arranged in a slot arm body 40. In this connection, the parts 10, 38, 39 and 40 form the pressing device by which, when the thrust rod 10 is urged downwardly along the path "B", the leaf springs 37 are compressed, the gate valve plates 17 are moved outwardly, and the seals 20 are pressed against seal bearing surfaces (not shown). The thrust rod 10 is coupled in the manner shown in FIG. 1 with the drive rod 6 via a joint 9 (not shown).

According to FIG. 4 the pressing device likewise consists of a thrust rod 10, which however carries two leaf springs 42 within the pendulum frame 14, on which the toggle levers 43 are secured by means of bearings 44. Corresponding bearings 41 are secured to the gate valve plates 17 which are guided, in the manner already described, in the pendulum frame 14 via guide pegs 19 and have seals 20. If the thrust rod 10 is displaced downwardly along the path "B", the toggle levers 43 are brought into their dead point position in which they exert the maximum force on the leaf springs 42 on the one hand, and on the gate valve plates 17 and thus on the seals 20 on the other hand. Any deformations of the seal 20 and the toggle lever system are compensated by the pre-stressed leaf springs 42. Moreover, varying gaps between the seals 20 and the seal bearing surfaces, not shown, as well as any remaining non-uniformities in the seals are compensated by the different deformability of the leaf springs 37 (FIG. 3) and 42 (FIG. 4), and accordingly the pressing device also has a self-adjusting function.

FIGS. 5 and 6 show a modified detail of the device according to FIGS. 1 and 2, which serves to lock the pendulum frame 14 and the pressing device. As previously, the same parts or parts having the same function are provided with the same reference numerals. In FIG. 5 the pendulum frame 14 is shown in a position shortly before reaching the closed position, and in FIG. 6 in the closed position after the pressing movement has been executed. In the device shown here, the thrust rod 10 of the pressing device does not act directly on the curved track 28 in the housing 2, but indirectly on a lever 47 and a roller 50 via a stop means 46. The lever 47 is mounted on the pendulum frame 14 by means of a peg 48 and carries the roller 50 on the lever arm opposite the stop means 46. The roller cooperates with the curved track 28 in the swivelling movement of the pendulum frame 14, and shortly before the closed position is swivelled with the residual swivelling movement of the pendulum frame 14 about the peg 48 by a stop means 52 in the housing, and is thereby moved into a recess 53. The curved track 28, stop means 52 and recess 53 are in the housing 2, as is the counter stop means 27 against which the stop means 26 on the pendulum frame 14 comes to rest.

In the closed position according to FIG. 6 the stop means 26 bears against the counter stop means 27, and the roller 50 has been swivelled into the recess 53. The stop means 46 has released the thrust rod 10 so that the latter could be displaced along the path "B" for the purpose of pressing the valve plates. The return swivelling movement of the lever 47 is consequently closed, whereupon the position of the roller 50 in the recess 53 is likewise closed, with the result that the pendulum frame 14 is arrested at the stop means 27 so long as the thrust rod 10 is in the pressing position according to FIG. 6. Only after retraction of the thrust rod 10 and the forced lifting of the gate valve plates from the sealing surfaces is the lever 47 released so that the pendulum frame 14 can swing out. Instead of the stop means 46, a roller can be arranged in a similar way. During the swivelling movement of the pendulum frame 14 the roller 50 runs on the curved track 28, whereby a locking of the thrust rod 10 over the whole swivelling range is achieved according to FIG. 5 and thus a pressing movement of the valve plates is prevented. The certainty thereby achieved is important inasmuch as a strict separation of the operations "SWIVEL" and "PRESS" is also achieved by the locking action if the gate valve is not in the vertical position shown in FIGS. 1 and 2, but is arranged in an inclined or horizontal position.

FIG. 7 shows a variant of the object according to FIGS. 1 and 2 in a view corresponding to FIG. 2, i.e. a side view of the complete pendulum gate valve, with the exception of the drive motor, and with the front wall removed. The housing 2, whose construction corresponds to that of FIGS. 1 and 2, has a housing cover 2a which closes an opening of such dimensions that the whole internal mechanism of the pendulum gate valve in the high swivelled position of the gate valve plate 17 can be removed at the top without lateral contact with the seal bearing surfaces. To this end, locking means (not shown) are provided between the housing cover 2a and the drive rod 6 in FIG. 7, by means of which the drive rod can be arrested in various positions so that for example the drive can be replaced without affecting the gate valve operation.

The object according to FIG. 7 has a pendulum frame 55 of a different construction, and reference may be made to FIG. 8 for a description thereof. A pedestal 56 is secured to the housing cover 2a and carries the shaft 25 for the swivelling movement of the pendulum frame 55. The pendulum frame 55 is composed of two parallel, spaced-apart roughly trapezoidal plates 57, between which is arranged a further shaft 58 on the end opposite the shaft 25, approximately in the same horizontal plane (referred to the vertical arrangement shown in FIG. 7). The front plate of the plates 57 is removed in the diagram according to FIG. 7. A lever 59 is mounted on the shaft 58, which can swivel independently with respect to the pendulum frame 55 but can swivel about the shaft 25 at the same time as the pendulum frame. The lever 59 is formed as a double lever and consists of two parallel brackets with a cross piece 60 therebetween, in which is simultaneously located the joint 9 between the drive rod 6 and thrust rod 10. The double lever 59 basically has a length which corresponds to the upper transverse measurements of the pendulum frame 55, i.e. it extends between the shafts 25 and 58. In the region of the shaft 25 it has a recess 61 which corresponds to the external contour of the shaft 25. The lever 59 can be swivelled downwardly about the shaft 58 from the position shown in FIG. 7, but cannot be swivelled upwardly. The thrust rod 10 for example prevents any upward swivelling movement, the freedom of movement of said thrust rod being furthermore restricted by the limited possibilities of movement of the pressing device and restraint 15. A bar 62 is located on the lever 59 and co-operates with a curved track 63 which, for its part, is secured to the pedestal 56. The bar 62 and curved track 63 thus have a similar function to the bar 30 and the curved track 28 in the object according to FIGS. 1 and 2. The two plates 57 of the pendulum frame 55 are securely connected to one another at the lower end and enclose the bearing 13 for the thrust rod 10. The bearing 13 continues towards the right in the form of a stop means 26 which cooperates with the counter stop means 27 of the housing 2.

In FIG. 7, the pendulum gate valve is shown, similarly to FIG. 2, in a swivelled but unpressed position. The restraint 15 for the valve plates 17 is also formed as a toggle lever system, similar to FIG. 1. The bar 62 is located just outside the edge 64 forming the end of the curved track 63. If the drive rod 6 is not drawn upwardly, the pendulum frame 55 and with it the lever 59 executes a swivelling movement about the shaft 25 and the joint 9 moves on the upwardly directed part of the movement path 23. If on the other hand the drive rod 6 is moved downwardly, the pendulum frame 55 remains at the stop means 27 in the rest position, whereas the lever 59 executes a downward swivelling movement about the shaft 58. The bar 62 thus slides past on the circular arc edge 64 since it is not locked in this position. The joint 9 thus executes a movement in the direction of the downward part of the movement path 23. The valve plate or plates are thus pressed by the restraint 15.

For the sake of a better understanding, the movement sequence of the pendulum gate valve according to FIG. 7 is explained in more detail by means of FIGS. 9, 10 and 11, in which the same parts are provided with the same reference numerals.

If the drive rod 6 is drawn upwardly by the drive (not shown), it acts on the double lever 59 via the joint 9 and likewise attempts to draw the thrust rod 10 upwards. The gate valve plate 17 is however already in the non-pressed state. Since the thrust rod 10 is unable to follow, the lever 59 also cannot execute any further upward movement with respect to the shaft 25 and is thus blocked in this position in the pendulum frame 55. On further traction of the drive rod 6 there is a swivelling movement of the joint 9 about the shaft 25, whereupon the pendulum frame 55 and thus the gate valve plate 17 are also swivelled into the position shown in FIG. 9. The bar 62 moves above the curved track 63, whereby during the swivelling movement the lever 59 is secured in its relative situation to the pendulum frame 55, with the result that no pressing movement of the gate valve plate by a displacement of the thrust rod 10 relative to the pendulum frame 55 can occur. In the uppermost position shown in FIG. 9, the drive is switched off by a limit switch, not shown. During the swivelling movement in the direction of the arrow 65, the drive rod 6 executes a movement denoted by the path "A".

On closing the pendulum gate valve the drive rod 6 is driven in the opposite direction, the pendulum frame 55 together with the shaft 58 and the lever 59 moving about the shaft 25 in the direction of the arrow 66 until the position shown in FIG. 10 is reached, which corresponds to the position shown in FIG. 7. The bar 62 slides on the curved track 63, also during the downward movement, and accordingly a pressing movement of the gate valve plate cannot be initiated. In the position shown in FIG. 10 the bar 62 is immediately in front of the edge 64. With a further downward movement of the drive rod 6, no further downward swivelling movement of the pendulum frame 55 can occur as a result of the engagement of the stop means 26 and counter stop means 27. However, the lever 59 is swivelled about the shaft 58 as a result of the release of the bar 62 opposite the curved track 63, with the result that the pressing movement described in connection with FIG. 1 is executed by means of the restraint 15. The movement of the lever 59 in the direction of the arrow 67 relative to the pendulum frame 55 is shown in FIG. 11. The lever 59 executes a swivelling movement about the shaft 58 relative to the pendulum frame 55, which, depending on the value of the conversion ratio, follows the thrust rod 10. The stop means 61 is thereby lifted away from the shaft 25.

If in the object according to FIGS. 7 to 11 a toggle lever system is used as the restraint 15, then by suitably dimensioning the toggle lever and its joints such a large horizontal displacement of the valve plate(s) can be provided that until all toggle levers reach an approximately horizontal position, there is a sufficient "after stroke" that all post-deformations of the seals of the toggle lever mechanism, bearing materials etc. arising during the operation can be compensated. This means that at the start of the use of the pendulum gate valve the toggle levers exert only a relatively small angular movement until the elastic intermediate member (FIGS. 1 and 2) responds. Depending on the degree of wear and thus play in the overall drive system, the angular movement of the toggle levers and thus the adjustment of the thrust rod 10 and drive rod 6 increases.

In the pressing movement according to FIG. 11, the stroke of the drive rod 6 is designated by the path "B". The bar 62 is swung downwards over the circular arc edge 64 of the curved track 63. This prevents any swivelling movement of the pendulum frame 55 in the direction of the arrow 65 (FIG. 9), and in fact prevents any swivelling movement over the whole range of the pressing movement in accordance with the path "B" in FIG. 11. Only when the lever 59 has regained the middle position shown in FIG. 10, after the return movement, and the pressing movement is finished, is the locking action released and the swivelling movement of the pendulum frame 55 shown in FIG. 9 is able to begin.

FIGS. 7 to 11 show an embodiment of the actuation mechanism in which the drive rod 6 and the thrust rod 10 engage on the same joint 9, which is arranged in the common cross piece 60. It is however quite possible to separate the drive rod/lever joint connection on the one hand and the lever/thrust rod on the other hand, and to arrange a lateral misalignment or displacement with respect to the installation position. In this way lever arms of different length are formed so that it is possible to influence the conversion ratio of the thrust forces from the drive rod 6 to the thrust rod 10 and thus also alter the conditions of the path "A" and path "B".

Instead of the eccentric disc 3 a drive employing a spherical roller spindle with an endless screw drive can also be used with particular advantage. By a suitable design and layout of such a drive system a self-blocking effect can be achieved so that each of the shown positions can be reliably automatically locked. A further possibility for locking the positions shown is to provide a peg-type lock between the housing 2 and the drive rod 6.

We claim:

1. Pendulum gate valve with a pressure-tight housing and inlet and outlet openings arranged on opposite sides of said housing, with at least one seal bearing surface, a unitary pendulum frame pivotable transverse to the axis of the inlet and outlet openings about a single pivot axis which is stationary relative to the housing, stop means for limiting the pivoting movement of the pendulum frame, at least one gate valve plate mounted opposite the pendulum frame for movement parallel to the axis of the inlet and outlet openings, a drive rod passing in a pressure tight and essentially linear manner through the housing, a pressure device in the pendulum frame mounted for longitudinal movement with respect to the pendulum frame when actuated for urging the gate valve plate against the seal bearing surface and means pivotally joining the drive rod to the pendulum frame and the pressing device about a pivot joint which is movable with the pendulum frame about the stationary axis and movable with respect to the pendulum frame such that during the closure movement, the pendulum frame is first pivoted with the pivot joint moving therewith to align the gate valve plate with the seal bearing surface, and then the pivot joint moves with respect to the pendulum frame to actuate the pressing device and wherein the movement of the pendulum frame and thereafter the pressing device guides the drive rod and the joint in an essentially linear direction throughout the total path by the joint.

2. Pendulum gate valve according to claim 1, wherein the pressing device comprises a thrust rod connected to the drive rod and the longitudinal movement of the thrust rod is limited so that the pivot joint at the drive rod/thrust rod connection point executes an arcuate path with the pendulum frame about the shaft stationary pivot axis, and on a linear path within the stationary pendulum in the direction of the drive rod (6).

3. Pendulum gate valve according to claim 1, wherein the pressing device comprises a thrust rod and, wherein the pivotal joining means comprises a lever pivotable about a pivot axis in the pendulum frame and on which lever the drive rod is engaged and the thrust rod, the pivot axis being arranged transverse to the drive rod and at a distance from the stationary first axis for the pendulum frame, and the median line of the pivoting range of the lever referred to the closed position of the gate valve plate is substantially vertical to the direction of movement of the drive rod, and wherein the pivoting range of the lever is limited so that the pivot joint located at the drive rod/lever connection point executes an arcuate path with respect the pendulum frame to define a closure movement about the stationary pivot axis, and a linear path within the stationary pendulum frame, and a further pivoting movement about the pivot axis.

4. Pendulum gate valve according to claim 3, wherein the thrust rod on the lever engages at a point which lies outside the pivot joint and substantially on a straight line which passes through the joint and the pivot axis.

5. Pendulum gate valve according to claim 1, further comprising a locking device which arrests the pressing device on the arcuate path in the non-pressing position, and the pendulum frame in the pressing position.

6. Pendulum gate valve according to claim 5, wherein the locking device comprises a curved track, concentric with respect to the stationary pivot axis of the pendulum frame, whose arc length corresponds to the swivel angle of the pendulum frame, a bar arranged on the thrust rod, the curved track and bar being matched with respect to one another so that relative movement between the pendulum frame and thrust rod is prevented during the pivoting movement by the bar sliding on the said curved track, and wherein the thrust rod on reaching the stop means is released by the pendulum frame, and that conversely the pendulum frame is only released for the swivelling movement when the thrust rod has been retracted to the non-pressing position.

7. Pendulum gate valve according to claim 5, wherein the locking device comprises a curved track concentric to the stationary pivot axis of the pendulum frame and whose arc length corresponds to the swivel angle of the pendulum frame, a bar arranged on the lever, the curved track and bar being adjusted with respect to one another so that relative movement between the pendulum frame and lever is prevented during the pivoting movement, and wherein the lever on reaching the stop means on the pendulum frame is released and the pendulum frame is only released for the pivoting movement when the lever and with it the thrust rod has been retracted to the non-pressing position.

8. Pendulum gate valve according to claim 1, wherein the pressing device is provided with restraints acting in both directions.

9. Pendulum gate valve according to claim 8, wherein the restraint comprises a toggle lever system.

10. Pendulum gate valve according to claim 1, further comprising an elastic intermediate member arranged in the drive rod, which is compressed during the tensioning in the linear path.

11. Pendulum gate valve according to claim 9, wherein the toggle lever system comprises toggle levers holdable under the action of the elastic intermediate member in a position substantially different from the extended situation.

12. Pendulum gate valve according to claim 1, wherein the housing and drive rod are provided with devices for locking in different positions relative to one another.

* * * * *